US011973258B2

(12) United States Patent
Bolisay

(10) Patent No.: US 11,973,258 B2
(45) Date of Patent: Apr. 30, 2024

(54) COMPACTABLE STRUCTURES FOR DEPLOYMENT IN SPACE

(71) Applicant: L'Garde, Inc., Tustin, CA (US)

(72) Inventor: Linden Bolisay, Fountain Valley, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

(21) Appl. No.: 17/450,975

(22) Filed: Oct. 14, 2021

(65) Prior Publication Data

US 2022/0115761 A1 Apr. 14, 2022

Related U.S. Application Data

(60) Provisional application No. 63/091,918, filed on Oct. 14, 2020.

(51) Int. Cl.
*H01Q 1/08* (2006.01)
*H01Q 1/28* (2006.01)
*H01Q 11/08* (2006.01)

(52) U.S. Cl.
CPC .......... *H01Q 1/081* (2013.01); *H01Q 1/084* (2013.01); *H01Q 1/085* (2013.01); *H01Q 1/288* (2013.01); *H01Q 11/086* (2013.01)

(58) Field of Classification Search
CPC .......... H01Q 1/08; H01Q 1/081; H01Q 1/082; H01Q 1/084; H01Q 1/085; H01Q 1/288; H01Q 9/28; H01Q 11/08; H01Q 11/086; Y10S 343/02; B64G 2001/224
See application file for complete search history.

(56) References Cited

U.S. PATENT DOCUMENTS

| | | | | |
|---|---|---|---|---|
| 3,354,458 | A * | 11/1967 | Rottmayer | H01Q 1/288 342/10 |
| 9,666,948 | B1 * | 5/2017 | Rao | H01Q 11/08 |
| 9,742,058 | B1 * | 8/2017 | O'Neill, Jr. | H01Q 1/08 |
| 10,347,962 | B1 * | 7/2019 | Georgakopoulos | H01Q 1/362 |
| 2007/0008232 | A1 * | 1/2007 | Weinstein | H01Q 1/34 343/709 |
| 2017/0310014 | A1 | 10/2017 | Liu et al. | |
| 2019/0097300 | A1 | 3/2019 | Palisoc | |

FOREIGN PATENT DOCUMENTS

| | | | | |
|---|---|---|---|---|
| FR | 3081842 A1 * | 12/2019 | | B64G 1/222 |
| GB | 2322236 A * | 8/1998 | | H01Q 11/08 |
| WO | WO-2020249900 A1 * | 12/2020 | | B29C 61/003 |
| WO | WO-2021224572 A1 * | 11/2021 | | H01Q 1/288 |

OTHER PUBLICATIONS

K.Sonoda, "Materials application for spacecraft use in Japan," in IEEE Electrical Insulation Magazine, vol. 8, No. 2, pp. 18-26, Mar.-Apr. 1992, doi:10.1109/57.127012. (Year: 1992).*

* cited by examiner

*Primary Examiner* — Ab Salam Alkassim, Jr.
*Assistant Examiner* — Leah Rosenberg
(74) *Attorney, Agent, or Firm* — Kari L. Barnes

(57) ABSTRACT

Systems and methods described herein include collapsible and deployable antenna structures. The antenna structures may include any combination of shape memory composites, inflatable envelopes, and/or degradable materials.

20 Claims, 5 Drawing Sheets

COMPACTABLE STRUCTURES FOR DEPLOYMENT IN SPACE

PRIORITY

The instant application claims priority to U.S. Provisional Patent Application No. 63/091,918, filed Oct. 14, 2020, titled Compactable Structures for Deployment in Space, which is incorporated by reference in its entirety herein.

BACKGROUND

Space structures must balance a number of functional attributes. For example, the stronger a material is, the longer it may last in space or the easier it may be to deploy without failure. However, the object is likely to be heavier and larger, and the cost of getting the object up in space increases exponentially.

Space structures may also be limited, such as in their design or material composition because of the environmental conditions and changes imposed in deploying an object into space and/or in the deployment conditions themselves. For example, an article for space deployment must transition through different environments. An article of any size is also preferably deployable. There may be different ways to deploy an object. The deployment of an object from a stored condition to a deployed or use condition will impose forces and stresses on the object that may limit the construction materials and/or the shape, size, orientation, configuration, and combinations thereof of the object to be deployed.

Accordingly, typical antennas for space are rigid structures made from conductive metals. The nominal size of the antenna is conventionally on the order of the radio wave being received, which for S-band frequencies can be as much as 10-15 centimetres. This is the size of a typical U CubeSat that must also contain electronics, cameras, a power source, and other components. This poses logistical problems for the satellite that would preferably be stowed during launch and deployed when in orbit. Such stowable configurations of conventional antennas are difficult given their material construction limitations. As a result, antennas used for small satellites are generally very limited in size. Therefore, the beam pattern of an antenna may be compromised or narrowed to reduce size.

SUMMARY

Antennas and satellites described herein may include a satellite base structure. The satellite base structure may be a desired object for use in space, such as an antenna and/or solar sail. Any space structure may be within the scope of the present disclosure.

Exemplary embodiments include a satellite structure that is deployable from a stored configuration to a deployed configuration. Exemplary embodiments of the satellite structure may include materials that are susceptible to being bent or maintaining the same shape in the stored configuration, such as being susceptible to creep. Exemplary embodiments of the satellite structure may include materials and/or structural shapes (including sizes) that are insufficiently strong to withstand deployment forces to transition from the stored configuration to the deployed configuration.

Exemplary embodiments include a degradable layer for covering (either as an underlayer and/or overlayer) of the satellite base structure. The degradable layer may comprise a layer degradable in outer space, such as in contact with atomic oxygen and/or radiation. The degradable layer by itself and/or in combination with a substrate layer and/or satellite base structure may be sufficiently strong to withstand the deployment from the stored configuration to the deployed configuration.

Exemplary embodiments may therefore include methods in which the degradable layer is configured to degrade once exposed to the degradable environment. In an exemplary embodiment, the degradable layer is degraded to expose the satellite base structure. In an exemplary embodiment, the degradable layer may be used to protect and/or assist the satellite base structure until deployed in the deployed configuration.

Although exemplary embodiments described herein are described in terms of using the degradable layer to assist in deployment other purposes of the degradable layer may also be used. In an exemplary embodiment, the degradable layer may be degraded in space to reduce a mass of the system after deployment. The degradable layer may be used to protect and/or retain the satellite base structure in a desired configuration. In an exemplary embodiment, the degradable layer may be used to retain the satellite base structure to a substrate layer. In an exemplary embodiment a substrate layer may also be degradable.

In an exemplary embodiment, as the system including the satellite base structure is in a stored configuration. The satellite base structure may comprise a housing. The housing may protect the satellite base structure and/or retain the base structure in the stored configuration. The housing may reduce contact of the degradable layer to the degrading environment so that the degradable layer does not degrade or reduces the degradation rate while in the stored configuration.

Exemplary embodiments include an antenna made of a satellite base structure and a degradable layer. Exemplary embodiments permit the transition of the antenna from a deformed, stowed shape to a deployed shape. The deformed shape may be collapsed or otherwise define a smaller dimension or volume for storage and transport. In an exemplary embodiment, the satellite base structure may be deformable between the stored configuration and the deployed configuration.

Exemplary embodiments may include a satellite base structure comprising a gossamer thin film. The satellite base structure may comprise a mesh foil. The satellite base structure may comprise a foil. The satellite base structure may comprise a conductive material.

Exemplary embodiments, may comprise a shape memory composite material. The shape memory composite material may include a conductive material to act as an antenna. The shape memory composite material may be conductive through material selections of the fibers, the resin to retain the fibers, additives to the fibers and/or resin, coatings, and other methods described herein. The fibers may be conductive. The resin may be conductive. Metallic or conductive powders, additives, or fillers may be added to the resin or filler between fibers. Metallic strands may be incorporated with or used exclusively as the composite fibres. Thin metallic foils may be wrapped or used to cover all or part of the members created by the shape memory composite material. Conductive paint or other coatings may be applied to all or part of a surface of the component created by the shape memory composite material. Exemplary embodiments of a shape memory composite structure for use as an antenna are disclosed in PCT/US2020/48848, filed Aug. 31, 2020, which is incorporated in its entirety herein by reference. Exemplary embodiments of the degradable layer may be used as the substrate and/or in combination with the substrate and/or shape memory composite as described. The degradation of the degradable layer may therefore be used to assist in the deployment of the shape memory composite to then degradable and reduce a weight of the antenna after deployment and/or reduce/remove interference to the antenna.

DRAWINGS

DESCRIPTION

Figure 1:
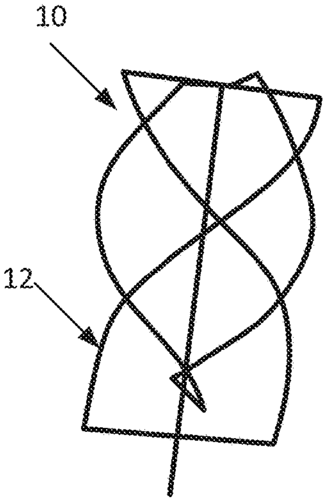
FIGS. 1-3 illustrate exemplary antenna shapes according to embodiments described herein.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments may use a satellite base structure. The satellite base structure may comprise a metallic, conductive, and/or reflective material. The satellite base structure may be configured in a deployed configuration as an antenna, solar sail, reflector, or other space structure. The satellite base structure may comprise a material and/or shape for achieving the object in space. In an exemplary embodiment the satellite base structure may be insufficiently strong (due to material selection and/or shape, size, orientation, etc.) to deploy from the stored configuration to a deployed configuration through a desired deployment mechanism. In an exemplary embodiment the satellite base structure may be insufficiently shaped (due to permeability, shape, size, orientation, apertures, etc.) to deploy from the stored configuration to a deployed configuration through a desired deployment mechanism. The deployment mechanism may be, for example, inflation. The deployment mechanism may be through an expansion system imposing a pulling and/or pushing force on the satellite base structure. The deployment mechanism may comprise unfolding the satellite base structure.

Exemplary embodiments may use a dynamically deformable material as a support and deployment structure for supporting the satellite base structure. In an exemplary embodiment, the satellite base structure comprises an electrically conductive material to create an antenna form geometry. In an exemplary embodiment, the dynamically deformable material may include an electrically conductive material for creating an antenna form. In an exemplary embodiment, the dynamically deformable material may not include an electrically conductive material, but may support an electrically conductive material in a desired form.

Exemplary embodiments may use an envelope contained around and/or supported by the satellite base structure. The envelope may be gas impermeable or semi-gas impermeable to inflate upon deployment of the antenna. The envelope may be inflated to assist the antenna to transition to a deployed configuration. The envelope may be inflated to release the antenna from a stowed configuration. The envelope may act as a substrate to support an electrically conductive material to create the antenna form. The envelope may comprise a degradable material.

Exemplary embodiments may comprise a degradable layer positioned over the satellite base structure. The degradable layer may be used in combination with the envelope or alone. The degradable layer may be positioned over the satellite base structure to provide structure support and/or strength to the satellite base structure during deployment. The degradable layer may therefore be a coating over all or a portion of the satellite base structure. The degradable layer may be a layer over all or a portion of the envelope (if present). The degradable layer may be a layer around an outer surface perimeter defined by or created by all or a portion of the satellite base structure in a deployed configuration. In an exemplary embodiment, the degradable layer may be dynamically deformable.

Although embodiments of the invention may be described and illustrated herein in terms of specific antenna configurations, it should be understood that embodiments of this invention are not so limited, but are additionally applicable to different antenna configurations.

Although exemplary embodiments are shown and described with respect to creating omnidirectional antennas for free space communications between ground stations and other spacecraft, other applications are within the scope of the instant disclosure. For example, directional antennas are within the scope of the instant disclosure. Other uses are also within the scope of the instant application and not just space communications between spacecraft. Exemplary embodiments also disclosed include different combinations and configurations of a satellite base structure that may be used for different purposes, such as a solar sail. In this configuration, the satellite base structure may comprise a planar structure and/or sheet, grid, or other structure for reflecting solar energy to create drag.

Any feature, component, configuration, and/or attribute described for any one example may be used in combination with any other example. Accordingly, any step, feature, component, configuration, and/or attribute may be used in any combination and remain within the scope of the instant description. Features may be removed, added, duplicated, integrated, subdivided, or otherwise recombined and remain within the scope of the instant disclosure. The exemplary embodiments described herein are provided for sake of example only. Therefore, any satellite base structure may be used with or without an envelope according to embodiments described herein. Any satellite base structure may be used with or without a tear away or break away retention device according to embodiments described herein. Any satellite base structure may be used with an inflation mechanism according to embodiments described herein.

FIGS. 1-10 illustrate exemplary antenna shapes according to embodiments described herein. In an exemplary embodiment, the antenna structure 10, 20, 30, 40, 50, 60, 70, 80, 90, 100 may comprise a gossamer thin film, foil, or other material or size insufficient to reliably withstand the deployment of the antenna structure from a stored configuration to a deployed configuration. Exemplary embodiments may comprise a satellite base structure 12, 22, 32, 42, 52, 62, 72,

82, 92, 102. The satellite base structure may be deformable to permit the antenna to collapse under imposition of an outside force. The collapsed configuration may therefore by dynamically determined based on the storage compartment or the outside force applied. For example, the satellite base structure may be flexible or deformable along a length when a force is applied. In an exemplary embodiment, the satellite base structure may flex at one or more locations about or along the structure. In an exemplary embodiment, the satellite base structure may comprise a deployed shape that is maintained without the use of an outside force once deployed. The predefined shape may be defined through the relationship and connections with one or more other support structures, such as envelopes or shape memory composite materials, as described herein.

Exemplary embodiments comprise a satellite base structure. Exemplary embodiments comprise a support structure. The support structure comprises a layer positioned on or over all or a portion of the satellite base structure. The support structure may comprise a degradable layer on all or a portion of the satellite base structure. The degradable layer may be configured to support the satellite base structure during storage and/or deployment. The degradable layer may thereafter be configured to degrade and leave the satellite base structure after degradation.

FIG. 1 illustrates an exemplary embodiment of an antenna configuration 10 in which the conductive material is shaped as a Quadrifilar (four helical conductors) Helical Antenna. As illustrates, the antenna structure includes satellite base structure 12 that comprises a conductor. The conductive members define four helical strands wrapped about a central longitudinal axis. The central longitudinal axis may include a conductive shaft. Opposing ends of the quadrifilar may include radial extension coupling each helical strand to the longitudinal axis or central shaft at opposing ends of each helical strand. The helical strands may be circumferentially offset by 90 degrees. The helical strands as well as the central shape may be made of shape memory composite to permit the entire structure to deform and flex in any non-structured or random configuration to fit within a desired storage space. Portions of the helical strands and/or central portion may be made of shape memory composite.

Figure 2:
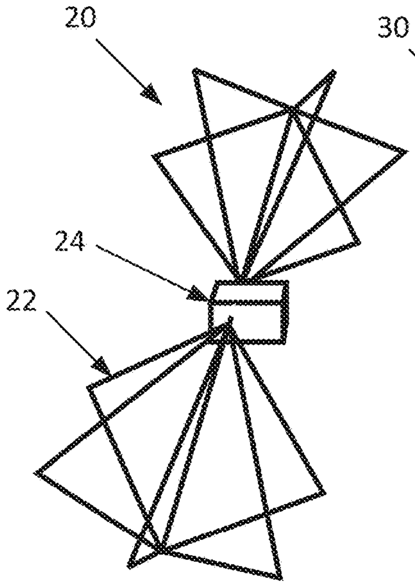

FIG. 2 illustrates an exemplary embodiment of an antenna configuration 20 defining a biconical antenna. As illustrated, the antenna may include a hub 24. Extending from opposing sides of the hub along the antenna center is a longitudinal axis defined for reference. A conductive shaft may be aligned with the longitudinal axis. As illustrated, five conductive members extend radially and longitudinally away from the hub on each side of the hub. The five members may extend radially outward to a distance and then extend radially inward toward the longitudinal axis to couple to the shaft. The portion of the conductive member that extends radially inward may extend only radially inward such that the conductive member defines part of a right triangle. The conductive member may also continue to extend longitudinally away from the hub as it extends radially inwardly, thus defining other bent, angled, or triangular shapes.

Figure 3:
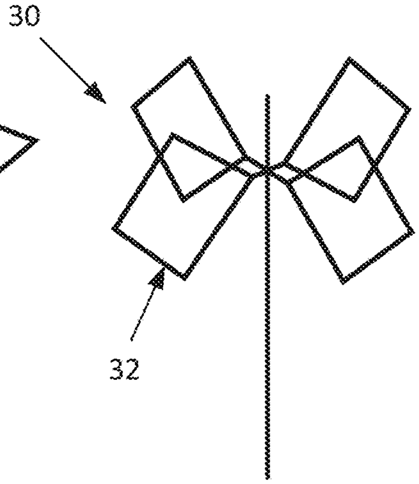

FIG. 3 illustrates an exemplary antenna configuration 30. The conductive material may be within the satellite base structure 32 as described herein. The conductive material may define one or more rectangular, square, quadrilateral shape, or other geometric shapes. The shapes may be positioned such that a plane of the shape includes or passes through a longitudinal axis of the antenna configuration defined for reference. The shapes may be circumferentially offset and positioned circumferentially about the longitudinal axis. A conductive shaft may be aligned with the longitudinal axis and/or may define the longitudinal axis.

FIGS. 4-10 illustrate exemplary antenna configurations according to embodiments described herein including an envelope. Exemplary embodiments as illustrated show exemplary embodiments of a support structure as described herein in dashed lines. The support structure is illustrated in a different line type to distinguish the component parts for sake of illustration and to improve the understanding of the invention. The dashed line is not intended to suggest or represent holes or apertures within the support structure, although the support structure may include such features. In an exemplary embodiment, as described herein, the support structure is gas impermeable.

In an exemplary embodiment, the antenna structure 40, 50, 60, 70, 80, 90, 100 may be supported by a support structure 46, 56, 66, 76, 86, 96, 106. The support structure 46, 56, 66, 76, 86, 96, 106 may be conductive or non-conductive. The support structure may provide other features for the antenna, such as shape support, signal effects, directional effects, storage retention, deployment actuation, or combinations thereof. In an exemplary embodiment, the support structure comprises a thin film that is flexible. The support structure may therefore be collapsible and/or deformable in the same or similar way as the antenna structure. The support structure may be a dielectric membrane. The support structure may be a fabric, mesh, or sheet. The support structure may be Kapton, Mylar, Teflon, cotton, or other dielectric and/or non-conductive material. Although shown as included with only a subset of the exemplary embodiments, the support structure may be used with any antenna configuration described herein. The support structure may be coupled to the shape memory composite material, the conductive components, other components of the antenna, or combinations thereof.

In an exemplary embodiment, the support structure 46, 56, 66, 76, 86, 96, 106 defines a thin surface. The support structures 46, 56, 66, 76, 86, 96, 106 may comprise flexible materials coupled to any combination of other additional support structures, support structure, shape memory composite components, and/or conductive components. In an exemplary embodiment, the support structure 46, 56, 66, 76, 86, 96, 106 defines a gas impermeable or semi-impermeable surface. The support structure may be an envelope to define an interior cavity. The support structure may be positioned to create a continuous and gas-impermeable surface around the interior cavity. In an exemplary embodiment, as described more fully herein, the support structure may be inflatable. In an exemplary embodiment, the support structure may be inflatable to assist in the deployment of the antenna structure. The support structure may be configured to vent the inserted fluid after inflation and/or may be configured to retain the fluid for a period of time after inflation. A gas semi-impermeable surface may therefore include a surface that retains sufficient gas in order to assist with deployment and initial inflation but may vent gas thereafter. A gas impermeable surface may be configured to retain sufficient gas for a desired amount of time that may be longer than the initial deployment and initial inflation, but which may still include surfaces that vent over time.

In an exemplary embodiment, the support structure comprises a degradable material. The support structure may therefore be configured to degrade after deployment of the satellite base structure. In an exemplary embodiment, the degradation may be over approximately 1 to 5 days. In an exemplary embodiment, the degradable material comprises a degradable polymer. For example, the degradable material may be mylar, polyester, Kapton, polystyrene, or combinations thereof. In an exemplary embodiment, the degradable material is configured to degrade in the presence of atomic oxygen. In an exemplary embodiment, the degradable material is configured to degrade in the presence of solar radiation.

Figure 4:
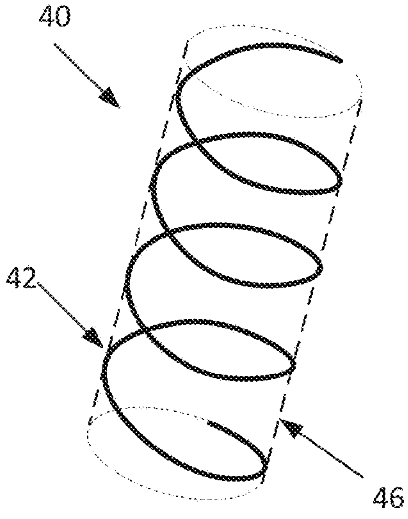
FIGS. 4-10 illustrate exemplary antenna configurations according to embodiments described herein including an envelope that may comprise a degradable layer.
Figure 5:
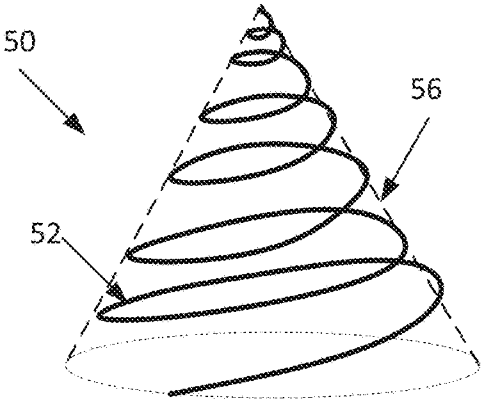
Figure 6:
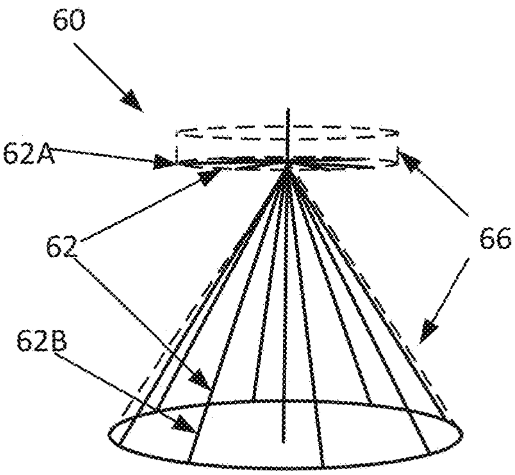

FIGS. 4-6 illustrate exemplary configurations in which the satellite base structure 42, 52, 62 are positioned within a layer of the support structure 46, 56, 66. FIG. 4 illustrates an exemplary circular cylindrical support structure 46 having one helical conductive component 42. Other helical configurations may also be added to the support structure (such as illustrated by FIG. 1). FIG. 5 illustrates an exemplary circular conical support structure 56 having one spiral conductive component 52 that is coupled to the support structure such that a diameter of the spiral conductive component tapers from one end to an opposite end of the antenna. The conical support structure may come to a point or may terminate toward the smaller diameter end before coming to a point. Other spiral or patterned configurations may also be added to the support structure.

Exemplary embodiments may also use a combination of dielectric and/or non-conductive layers to create complex antenna configurations with leads that may overlap each other but may or may not contact one another. For example, a first cylindrical support structure may be used with conductive material one either interior and/or exterior surface(s). A second cylindrical support structure may be positioned over or inside the first cylindrical support structure enclosing conductive material between the first layer and the second layer. Another side of the second cylindrical support structure on a side opposite the side contacting the enclosed conductive material may also include conductive material. The antenna may therefore include a first conductive layer defining a first pattern, a non-conductive and/or dielectric layer, a second conductive layer defining a second pattern. The antenna may include additional combinations of conductive layers and non-conductive and/or dielectric layers. The different layers may be used to create complex antenna configurations and different conducting patterns that may be electrically coupled and/or electrically isolated.

FIG. 6 illustrates an exemplary configuration having a plurality of support structures 66 and conductive members 62. As illustrated, different antenna shapes may be created. As seen in FIG. 6, a first antenna shape portion defines a plurality of radially extending conductive components 62A. A second antenna shape portion defines a plurality of radially and longitudinally extending conductive components 62B that create a generally conical configuration. The first support structure may define a generally cylindrical shape, while the second support structure may define a generally conical shape. Each of the conductive components may be coupled to a surface of the support structure. The support structures may define separate volumetric cavities. The cavities of the support structures may be in communication or may be isolated. The volumetric cavities may be used to deploy and/or support the antenna according to the deployment method described herein.

Figure 7:
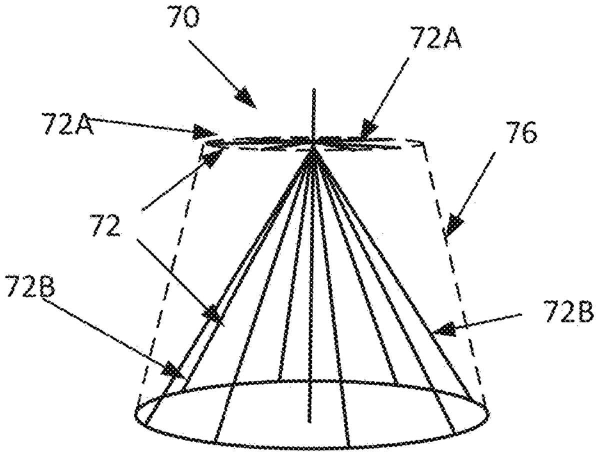

FIG. 7 illustrates an exemplary antenna structure 70 that has the same conductive pattern as the antenna structure 60 of FIG. 6. The shape of the support structure 76 however is different to support the antenna conductive shape memory conductive components 72. As illustrated in FIG. 7, at least some of the conductive components and/or shape memory composite components or portions thereof are off of the surface of the support structure and contact only a portion to support the support structure. As illustrated, the support structure 76 defines a partial or truncated cone. The radial conductive and/or shape memory composite components 72A are positioned along their entirety along the surface of the support structure 76. However, the radial and longitudinal conductive components 72B extend within an interior of the support structure, away from the surface of the support structure 76. The conductive and/or shape memory composite components 72B couple at their terminal ends to an edge of the support structure 76.

Figure 8:
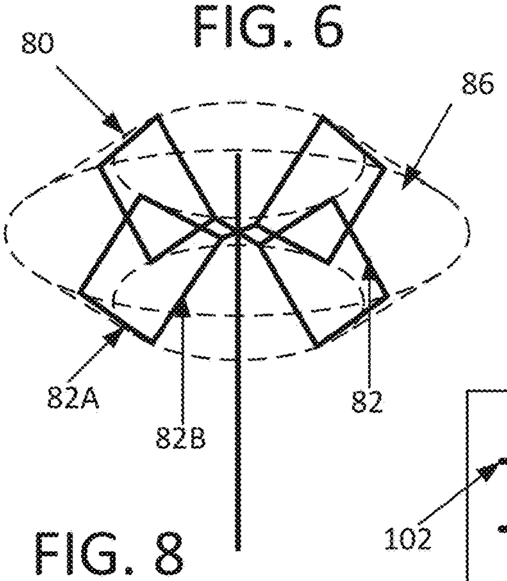

FIG. 8 illustrates another exemplary antenna structure 80 having a support structure 108. The antenna structure 80 may be similar to that of FIG. 3 having similar conductive components 82 as the components 32. The antenna structure 80 may also include a combination of first component segments 82A that extend along a surface of the support structure 86 and second component segments 82B that extend within an interior of the support structure 86. A person of skill in the art would appreciate that other support structure 86 may also be used. For example, a toroidal support structure could be used that have a cross sectional shape approximating the conducive component segments (i.e. a quadrilateral as illustrated).

Figure 9:
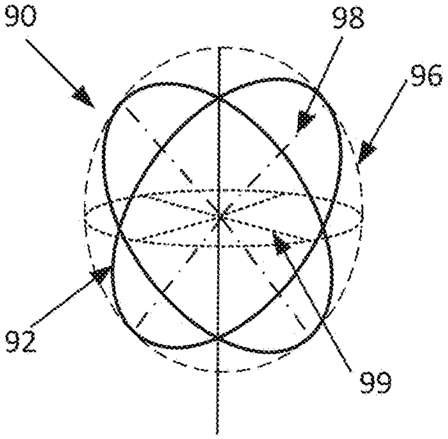
Figure 10:
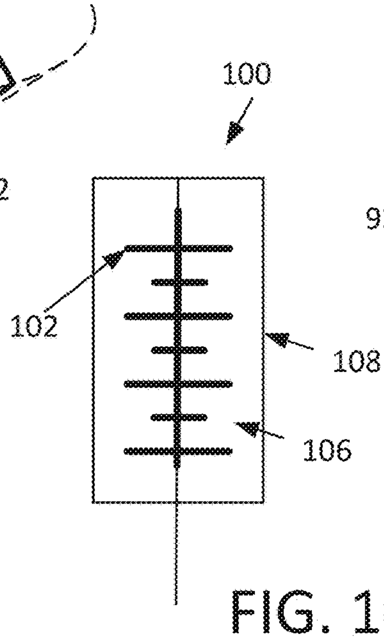

As illustrated in FIGS. 9-10, the antenna may be defined by conductive traces formed on the support structure. The traces may be from a conductive material. The traces may be from a coating, fiber, wire, paint, or other structure supported on and/or in and/or through the support structure. The design of the antenna structure 90, 100 may be separated such that design considerations for the support may be maximized while design considerations for the antenna may also be maximized. By decoupling the conductive material from a support structure, the design considerations may both be improved. For example, fewer support structures components may be use, thus minimize the stowage configuration, while maintaining the response of the antenna with appropriate number of conductive components.

As illustrated in FIG. 9, the antenna structure 90 may also include additional support structures 99. The additional support structures may comprise flexible materials coupled to any combination of other additional support structures, support structure, shape memory composite components, and/or conductive components. The additional support structures may be used to support conductive components that may or may not be positioned on the support structure. In an exemplary embodiment, the additional support structures may be strings, elongated flexible members, wires, bands, or combinations thereof. The additional support structures may be used to reinforce one or more of the additional support structures, support structure, shape memory composite components, and/or conductive components. The additional support structures may be used to influence a shape, such as the deployed shape, of any combination of the additional support structures, support structure, shape memory composite components, and/or conductive components. For example, as seen in FIG. 9, additional support structures 99 may be used to reinforce the support structure 96 and create a reduced diameter section by coupling to the additional support structure 99 and/or support structure 96 to an interior of the antenna structure 90. The additional support structures may therefore be used to create complex shapes for use with novel antenna designs.

In an exemplary embodiment, any combination of the support structure, additional support structures, and/or other component parts of the system may comprise a degradable material.

In an exemplary embodiment, the shape memory composite material may be integrated with the support structure. The shape memory composite material may create the support structure.

In an exemplary embodiment, the shape memory composite material may create a framework to which the support structure is attached. As described herein the shape memory composite may be within or coupled along its entirety to the support structure. The shape memory composite components may also be coupled to the support structure along a portion or point of the shape memory composite component. A combination of support structure and/or shape memory composite components may be used.

In an exemplary embodiment, a conductive material may be incorporated with the shape memory composite component. The conductive material may be as described herein within the shape memory composite and/or on a surface thereof.

In an exemplary embodiment, the conductive material may be support by or on the support structure. The conductive material may be positioned on the support structure in any fashion, such as being on a surface of the support structure, within the support structure, and/or coupled to the support structure. In an exemplary embodiment, the conductive material may be painted, coated, positioned on, woven into, or otherwise coupled to the support structure. For example, the conductive material may include thin sheet metal of copper. The sheet metal may be patterned and positioned on the surface of the support structure and coupled thereto. As another example, the conductive material may be fibers of thin copper wires. The fibers may be woven into or coupled to the support structure. The conductive material may be gossamer thin film of metal or other conductive material. The conductive material may be a foil. The conductive material may be a coating. The conductive material may be a mesh foil. The conductive material may be a mesh.

In an exemplary embodiment, additional structures may be used to deform and/or support the support structure and/or the conductive component. In an exemplary embodiment, additional structures may include flexible components, but may or may not also be shape memory. Additional support structures may couple to the shape memory components and/or the support structure to couple components parts together, define a deployed shape, support or create additional attachment points between component parts, influence deployment, or otherwise contribute to the design of the antenna structure.

Exemplary embodiments described herein may use any combination of the features described herein. In an exemplary embodiment, antenna structure may include any combination of the support structure, shape memory composite components, conductive components, additional structures, whether separate component parts and/or integrated in one or more ways such that a single component part functions as more than one component part. Exemplary embodiments include any combination of the support structure, shape memory composite components, conductive components, and additional structures comprise flexible components. Flexible components comprise a component part that may bend at any point or along a length. In an exemplary embodiment, any combination of the support structure, shape memory composite components, conductive components, and additional structures permit non-structured dynamic deformation. As described herein, the non-structure dynamic deformation permits flexing that may be defined by the external force deforming the component and not in an pre-configured or structurally limited fashion.

Figure 11A:
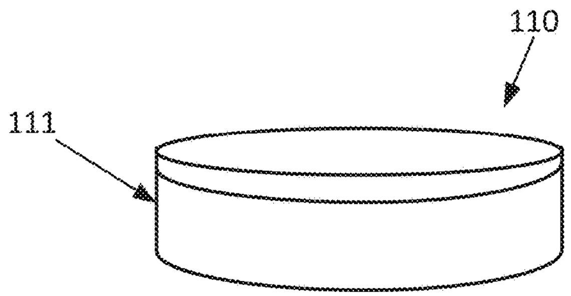
FIGS. 11A-11C illustrate an exemplary deployment sequence according to embodiments described herein.
Figure 11B:
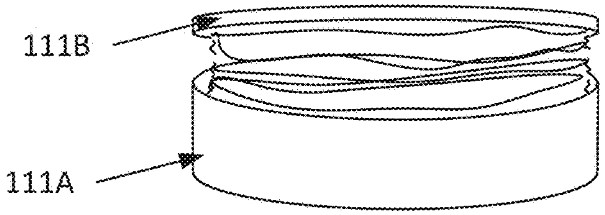
Figure 12:
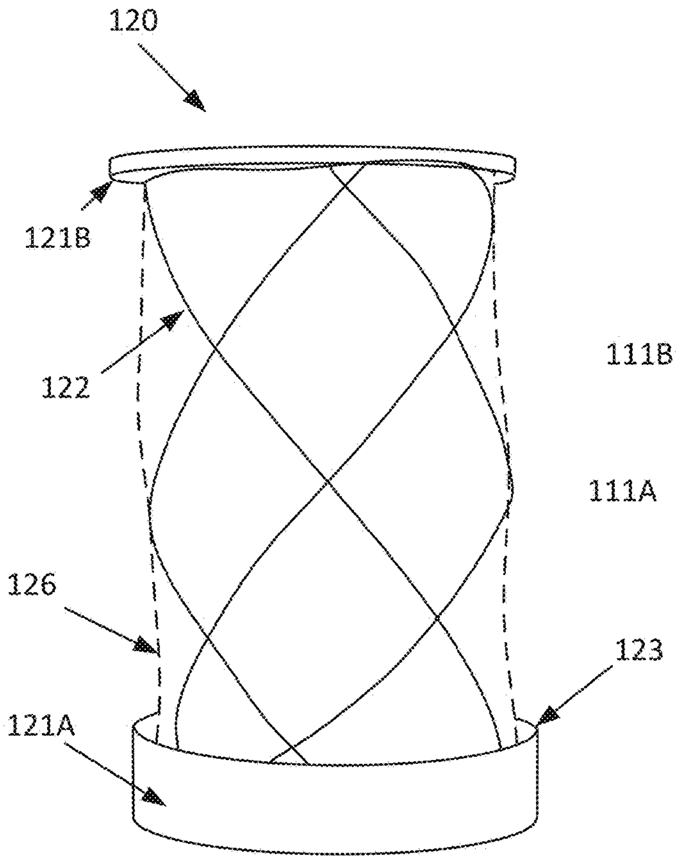
FIG. 12 illustrates an exemplary configuration according to embodiments described herein.

FIGS. 11A-12 illustrate exemplary embodiments of an antenna system 110, 120 including a housing 111, 121A, 121B. The housing may be used to impose an outside force to retain the antenna in a stowed configuration. Exemplary embodiments of the housing can be opened to remove the deformation force and permit the conductive component to expand. The system may include an opening mechanism to open the housing. The opening mechanism may include a hinge, pyrotechnic door, explosive bolts, failure component, or any other system for constraining the antenna in its stowed state. In an exemplary embodiment, the failure component is configured to withstand an applied force of at least a threshold amount. The failure component is configured to intentionally fail upon application of a force above the threshold amount. The failure component may be configured to apply the deformation force for restraining the shape memory component. The system may be configured to impose an additional force to deploy the antenna configured to overcome the threshold amount and fail the failure component to release the antenna.

Figure 11C:
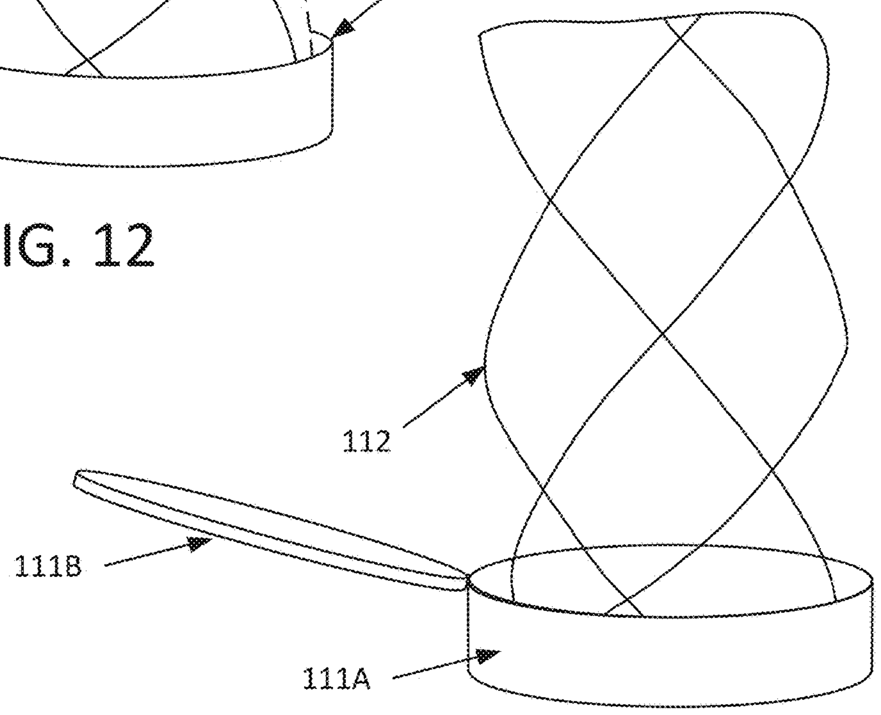

FIGS. 11A-11C illustrate an exemplary deployment sequence according to embodiments described herein.

Exemplary embodiments may include a stowed configuration as seen in FIG. 11A in which the antenna structure 112 is retained in the stored position having a reduced storage volume through application of an outside force; and a deployed configuration as seen in FIG. 11C in which the antenna structure is fully deployed having a larger volume when the outside force is removed. In other words, the remembered or biased configuration may be a deployed configuration in which the antenna structure is configured for use as a deployable quadrifiliar (such as seen in FIG. 1) or other small antenna shape (as seen in FIGS. 2-13B or otherwise configured according to embodiments described herein). The antenna structure 112 may be positioned within the housing 111 in the stowed configuration in a non-structured deformed configuration.

As seen in FIG. 11B, the housing 111 may be opened or otherwise configured to remove the retaining force on the antenna structure 112. In an exemplary embodiment, the housing may include a first part 111A and a second part 111B in which the first part and second part may be separable. The first part 111A may be coupled to the second part 111B in the stowed configuration to impose the deformation force in order to retain the antenna structure in the stowed configuration. The first part 111A may be opened and/or separated from the second part 111B. If opened, the first part 111A may be retained to the second part 111B such as by a hinge or other connection. As illustrated in FIG. 12, the first part 121A may be fully separated from the second part 121B. The first part and/or second part may create part of the support infrastructure and/or hub for the antenna system.

As seen in FIG. 11C, once the deformation force is removed, the antenna structure 112 may fully deploy. Deployment may be through removal of the deformation force, such as imposed by a retaining device on the shape memory composite components. The retaining device may be the housing or part of the housing and/or may be in another component part as described herein.

FIG. 12 illustrates an exemplary configuration according to embodiments described herein. FIG. 12 illustrates an exemplary antenna structure 120 comprising shape memory composite components 122 and support structure 126. The antenna structure 120 may include an exterior housing configured to enclose the shape memory composite components and/or support structure. The exterior housing 123 may include portions that are separable into a first portion 121A and a second portion 121B. The housing may be coupled together through a failure interface. For example, the failure may be through application of a substance, explosive, ignition, or additional force. The failure interface may be configured to retain the shape memory composite components in a deformed configuration to be stored. The failure interface may be configured to fail under a desired condition. Upon failure, the shape memory composite material may return to a remembered condition and deploy the antenna structure to a deployed configuration.

In an exemplary embodiment, the support structure may define a gas impermeable cavity or a gas semi-impermeable cavity. At deployment, the support structure may be injected with a fluid to inflate the support structure. The inflation of the support structure may be used to overcome the failure interface and release the antenna structure for deployment. Inflation of the support structure may assist in the shape memory composite material in deploying to a remembered configuration. The inflation may be used to counteract any creep or deformation that may have occurred in the antenna structure during storage for long periods of time. The support structure may thereafter loose inflation fluid over time. However, the shape memory composite material may thereafter sufficiently support the antenna structure such that additional inflation fluid is not required to retain the shape of the antenna structure for long term deployment.

Figure 13A:
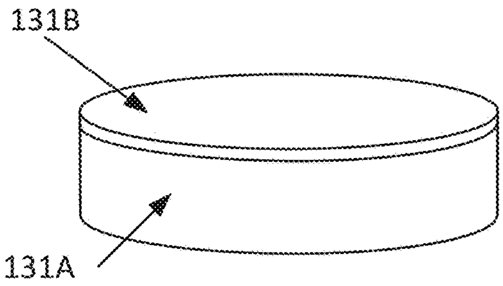
FIGS. 13A-13C illustrate an exemplary deployment sequence according to embodiments described herein.
Figure 13B:
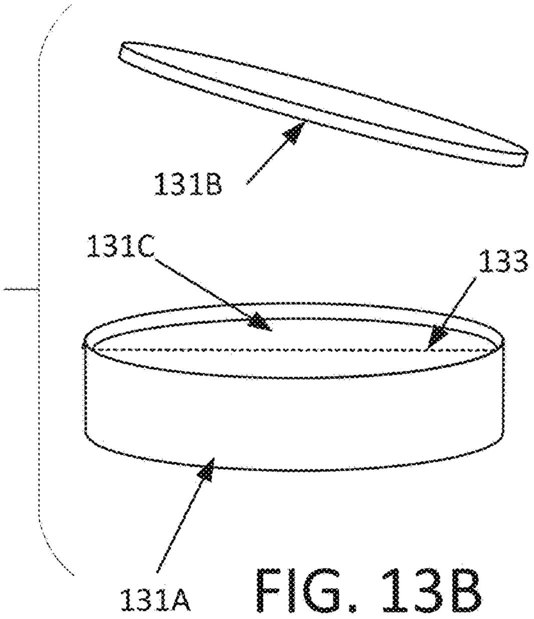
Figure 13C:
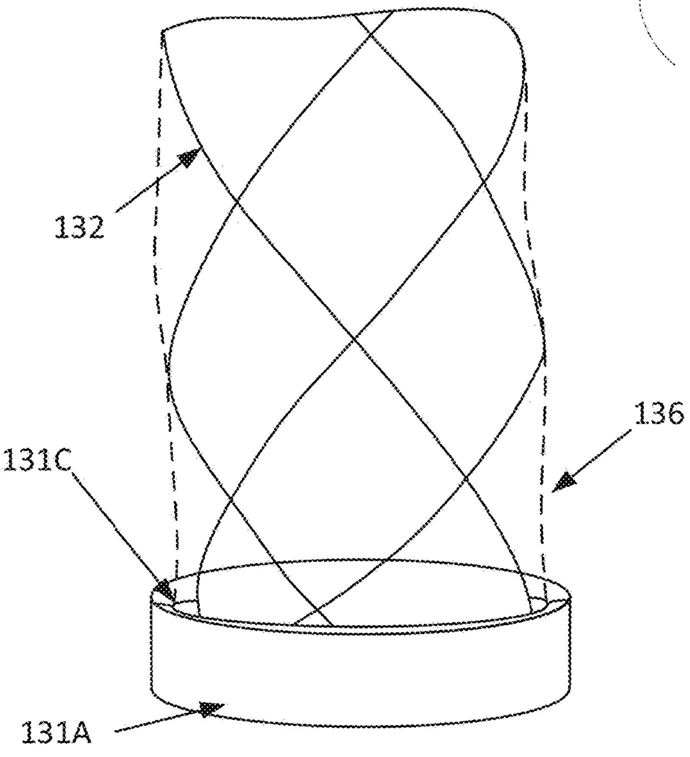

FIGS. 13A-13C illustrate an exemplary deployment sequence according to embodiments described herein. Similar to the deployment represented by FIGS. 11A-11C, the antenna structure may include shape memory composite component 132 that is in a stowed configuration upon application of a deformation force. Upon removal of the deformation force, and/or with use of a support structure defining an envelope receiving an inflation fluid, the antenna structure deploys and the shape memory composite components return to a remembered configuration.

In an exemplary embodiment, the antenna structure is retain in a housing 131A, 131B as seen in FIG. 13A. The housing may be a rigid structure for retaining and applying a retention force on the antenna structure, including the shape memory composite components. FIG. 13A illustrates that the housing may include a first part 131A for partially enclosing the antenna structure, with a second part 131B acting as a cover or lid to the first portion 131A. The lid may be used to support or impose a retention force on the antenna structure for long term storage.

When ready for use and transport to space, the second part 131B may be removed from the first part 131A as seen in FIG. 13B. The first part 131A may therefore define a first retention device for long term storage. Long term storage includes herein unknown durations of time, which may be on the matter of minutes, hours, days, weeks, months, or years. In an exemplary embodiment, a second retention device 131C imposes the deformation force to continue to retain the antenna structure in the stowed configuration. The second retention device 131C may be used for short term retention of the antenna structure. In an exemplary embodiment, short term may be for a known finite duration, even if the short term retention may be on the order of hours, weeks, months, or even years. As illustrated, the second retention device 131C includes a failure interface 133. The failure interface may be configured to tear, break, dissolve, or otherwise fail and permit the antenna structure to return to a remembered configuration. As illustrated, the second retention device 131C may define a thin covering sheet that includes a weakened portion to act as the failure device 133. The weakened portion may include a material portion that is perforated and therefore withstands a lower external force. Other configurations may also be used and remain within the scope of the instant disclosure, such as, for example, thinner material section, perforations, tears, degradable material, temperature sensitive material, and combinations thereof.

FIG. 13C illustrates a deployment of the antenna structure, when the shape memory material 132 overcomes the deformation force of the retaining device 131C, such that the retaining device 131C fails and the deformation force is removed. In an exemplary embodiment, the antenna structure includes a support structure 136 defining an inflation sleeve. The inflation sleeve may be inflated through injection of one or more fluids, such as gas, to apply an additional force on the retaining device 131C and overcome the failure interface 133. The injection of fluid into the inflation sleeve may therefore release the antenna structure from the stowed configuration to permit the shape memory composite components to return to a remembered configuration. The injection of fluid into the inflation sleeve may also assist the shape memory composite components to return to a remembered configuration. The inflation sleeve may be inflatable or retain the inflation gas for a period of time to overcome or counteract potential creep in the shape memory composite components or other shape retention any of the components the antenna structure may experience from longer duration times.

Figure 14:
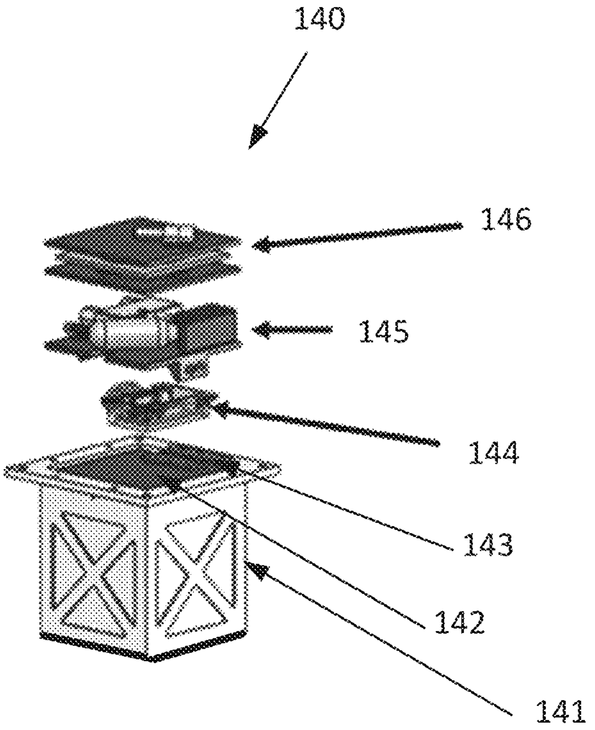
FIG. 14 illustrates an exemplary system according to embodiments described herein.

FIG. 14 illustrates an exemplary system according to embodiments described herein. As shown, the antenna system 140 may include one or more components within a housing 141. The housing 141 may be used for long term storage. The housing may include a door 142. The door 142 may impose a deformation force on the antenna structure to retain the antenna in a stowed configuration. The housing, and/or its door may be used for providing an additional retention force in additional to a deformation force imposed by another component part as described herein. The additional retention force may be used for long term storage and/or provide additional environmental protection for the antenna assembly while it is stored in an Earthly environment. The housing may therefore be sealed between the housing 141 and the door 142. The door may be fully removable or simply openable such as with hinge, 143.

Exemplary embodiments of the system may include electronics for controlling portions of the system. For example, 144 sequencer and/or electronic may include communication systems; interface systems for coupling to other electronic system; controllers; sequencer; and combinations thereof. The sequencer and/or electronics may communicate with controllers, and/or permit the actuation of one or more of the system components described herein. For example, a controller may interface with the fluid injection system to inflate the inflation envelope as described herein. For example, a controller may interface with the release mechanism for the antenna structure for removing the deformation force and permitting the antenna structure to return to a remembered configuration. This may be by opening the door 142 of the housing, or by firing a pyrotechnic charge to remove another failure component, by inflating the inflation envelop with a fluid to overcome a failure interface, or combinations thereof.

Exemplary embodiments of an antenna system may include one or more actuators 145 for controlling one or more components of the system. As illustrated, an exemplary actuator may include a compressed gas canister and controller. The compressed gas canister may be in fluid communication with an interior of a cavity of an inflation envelope created by a support structure as described herein.

Exemplary embodiments of an antenna system may include the antenna structure 146. The antenna structure 146 may include one or more component parts including any combination of a shape memory composite component, conductive component, support structure, housing, additional support structures, etc.

Antenna designs according to embodiments described herein may be capable of sending and receiving circularly polarized waves. Since the magnetic field generated by charged particles in the ionosphere induce Faraday rotation of linearly polarized beams, circularly polarized waves may be preferable to travel through the ionosphere.

Antenna designs according to embodiments described herein may be omnidirectional to allow for arbitrary satellite orientations. As examples only, different antenna designs are provided and described herein. Some examples may provide both circularly polarized waves and/or may be omnidirectional. For example, exemplary antenna designs that may provide both circularly polarized waves and be omnidirectional may include electrically conductive components in a helical shape and/or may define a biconical horn. Exemplary embodiments may use polarizing feeds. An exemplary helical design includes a quadrifilar (4 helical conductors) Helical Antenna, as illustrated in FIG. 1. An exemplary biconical antenna design is illustrated in FIG. 2.

Exemplary embodiments described herein may include shape memory components that can dynamically deform. Dynamic deformation as described and used herein includes non-structured deformation for stowage and/or deployment. Exemplary embodiments of the shape memory component may flex and bend or otherwise deform along a length of the shape memory component. The deformation may be along an entire length or portion of the shape memory component. The dynamic deformation can be folded into a smaller configuration, stowed in the Small Sat or other storage compartment, and released to expand to a deployed configuration. In an exemplary embodiment, the shape memory component comprises a remembered configuration. During use, exemplary embodiments may include a stowed configuration where the shape memory component may be retained through application of an outside force in the deformed shape. Upon removal of the outside force, such as a deformation force, the shape memory component expands to a remembered configuration. The remembered configuration may be the deployed configuration. Deployment may therefore be straightforward for a shape memory component structure since it merely requires that the mechanism constraining the shape memory component (such as the antenna) in the folded or stowed configuration be removed.

In an exemplary embodiment the shape memory component may comprise a shape memory composite. The shape memory composite may comprise fibers retained in a matrix or resin. The shape memory component may be conductive. To improve the antenna gain, the conductivity can be increased, such as by adding: (1) metallic powders to the matrix of the composite; (2) thin metallic foils wrapped around the shape memory composite component creating the antenna; (3) conductive paint applied to the surface of the shape memory component; and combinations thereof.

An exemplary shape memory composite material includes a base material of one or more of carbon fiber, Vectran, Kevlar, fiberglass, glass fibers, plastics, fiber metal. The base material may comprise strands. The stands may be generally aligned along a length of the structure, may include one or more aligned arrangements, may be wound or helically positioned, may be woven, or any combination thereof. The shape memory composite material may include a matrix around and/or between the base material. The matrix may be silicone, urethane, or epoxy. Exemplary shape memory composite materials are described in co-owned patent application U.S. Patent Publication No. 2016/0288453, titled "Composite Material". Exemplary embodiments include a high strain material to permit deformation. High strain materials generally have the capability to strain beyond 3% and not enter plastic deformation. In other words, the material may yield beyond 3%.

In an exemplary embodiment, the shape memory composite material includes a volume fraction ratio of fiber-to resin that may be controlled to achieve a desired shape memory retention even after long-term storage in a folded/packaged state. An exemplary fiber-to-resin volume fraction ratio is from 52 to 65, namely 52 percent to 65 percent fiber or 48 percent to 35 percent matrix or resin. The average fiber-to-matrix ratio is about 58 percent. The fibers may be carbon, Kevlar, Vectran, nylon, or otherwise described herein and the resin may be urethane, silicone or epoxy or otherwise described herein as the matrix.

In an exemplary embodiment, the member composed of the shape memory composite material may be conductive to define an antenna shape. All of a portion of the component may be conductive. The component may be conductive by incorporating a conductive material into the shape memory material. The component material may include a metallic powder, coating, wrapping, sheet, film, paint, strands, or combinations thereof. The conductive material may be in the fiber, resin, on the surface of the fiber, on the surface of the component material, or a combination thereof. In an exemplary embodiment, the shape memory composite component is conductive to create the antenna shape by wrapping the component in a thin sheet of copper. The copper sheet may be adhered or otherwise coupled to an exterior surface of the shape memory composite material shaft.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

What is claimed is:

1. An antenna having an antenna form geometry, comprising:

a base structure comprising a shape memory material for supporting the antenna;

a conductive material;

a degradable material contacting the conductive material, the degradable material degradable by a presence of atomic oxygen or solar radiation; and a support structure creating an inflatable enclosure, wherein the conductive material comprises conductive traces on the support structure.

2. The antenna of claim 1, wherein the base structure, conductive material, and the support structure are flexible so that the base structure and support structure may be deformed into a stored configuration configured to fit within a reduced volume and wherein the base structure, conductive material, and the support structure may expand into a deployed configuration configured to fit within an increased volume, wherein the increased volume is greater than the reduced volume.

3. The antenna of claim 2, wherein the support structure comprises the degradable material.

4. The antenna of claim 3, wherein the antenna form geometry is an omnidirectional antenna for free space communications between ground stations and spacecraft or between spacecraft.

5. The antenna of claim 3, wherein the antenna form geometry is a quadrifilar helical antenna or a biconical antenna.

6. The antenna of claim 3, wherein the support structure comprises a flexible thin film dielectric membrane.

7. The antenna of claim 6, wherein the inflatable enclosure defines an envelope creating an interior cavity, wherein the envelope creates a gas semi-impermeable surface around the interior cavity.

8. The antenna of claim 7, further comprising an inflation system to supply a material to the interior cavity and inflate the envelope.

9. The antenna of claim 8, further comprising a vent configured to release the material from the interior cavity after inflation of the envelope.

10. The antenna of claim 9, wherein the conductive material is positioned on a surface of the base structure.

11. The antenna of claim 10, wherein the support structure is coupled to the base structure such that inflation of the envelope to the deployed configuration positions the base structure in a desired configuration.

12. The antenna of claim 11, wherein the support structure comprises the degradable material that is configured to degrade over 1 to 5 days in the presence of atomic oxygen or solar radiation.

13. The antenna of claim 11, wherein the degradable material is configured as a degradable layer over at least a portion of the conductive material and the support structure so the conductive material is between the degradable material and the support structure.

14. The antenna of claim 13, further comprising a housing configured to apply a force on the base structure to maintain the base structure in the collapsed configuration.

15. A method of deploying an antenna, comprising:

providing an antenna having a base structure having a shape memory material for supporting the antenna; a conductive material, a support structure creating an inflatable enclosure, the support structure comprising a degradable material; wherein the conductive material comprises conductive traces on the support structure;

storing the antenna in a stored configuration defining a reduced volume, deploying the antenna to a deployed configuration defining an increased volume greater than the reduced volume by inflating the enclosure; and degrading the degradable material of the support structure.

16. The method of claim 15, further comprising:

positioning the antenna within a housing to apply a retention force on the antenna to keep the antenna in the stored configuration;

opening the housing to remove the retention force on the antenna, and wherein the degradable material is positioned over the conductive material and the degradable material degrades over time by solar radiation after opening of the housing and inflation of the enclosure.

17. The method of claim 16, wherein the antenna comprises a shape memory material, wherein deploying the antenna to the deployed configuration is by the shape memory material returning to a remembered form after removal of the retention force.

18. The method of claim 17, further comprising degrading the support structure over 1 to 5 days after inflation of the enclosure.

19. The method of claim 18, wherein the antenna, after deployment, defines a Quadrifilar Helical Antenna or a biconical horn.

20. An antenna, comprising:

a base structure for supporting the antenna, the base structure comprising a shape memory material;

a conductive material defining an antenna geometry;

a support structure creating an inflatable enclosure; and a degradable material positioned over the conductive material, wherein the conductive material comprises conductive traces on the support structure.

* * * * *